US011062322B2

(12) United States Patent
Patel et al.

(10) Patent No.: US 11,062,322 B2
(45) Date of Patent: Jul. 13, 2021

(54) SERVER AND METHOD FOR HOSTING A LEDGER

(71) Applicant: MASTERCARD INTERNATIONAL INCORPORATED, Purchase, NY (US)

(72) Inventors: Devesh Patel, Gujarat (IN); Rinkal Shah, Gujarat (IN); Mayur Raiyani, Gujarat (IN); Vimal Amrutiya, Gujarat (IN); Semal Gajera, Gujarat (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 252 days.

(21) Appl. No.: 16/166,550

(22) Filed: Oct. 22, 2018

(65) Prior Publication Data

US 2019/0197554 A1 Jun. 27, 2019

(30) Foreign Application Priority Data

Dec. 21, 2017 (SG) .......................... 10201710710X

(51) Int. Cl.
*G06Q 40/06* (2012.01)
*G06Q 20/42* (2012.01)
*G06Q 20/40* (2012.01)
*G06Q 40/02* (2012.01)

(52) U.S. Cl.
CPC .......... *G06Q 20/42* (2013.01); *G06Q 20/405* (2013.01); *G06Q 40/02* (2013.01)

(58) Field of Classification Search
CPC ...... G06Q 40/00; G06Q 20/42; G06Q 20/405; G06Q 40/02
See application file for complete search history.

(56) References Cited

U.S. PATENT DOCUMENTS

| 10,269,009 | B1* | 4/2019 | Winklevoss | ........... G06Q 20/36 |
| 2002/0161707 | A1 | 10/2002 | Cole et al. | |
| 2011/0270720 | A1 | 11/2011 | Manohar | |
| 2012/0173422 | A1 | 7/2012 | Hu | |
| 2014/0046818 | A1* | 2/2014 | Chung | ................... G06Q 40/00 705/35 |
| 2015/0287026 | A1* | 10/2015 | Yang | ...................... G06Q 20/06 705/69 |

OTHER PUBLICATIONS

Mauro Conti, Sandeep Kumar, Chhagan Lal, and Sushmita Ruj, A Survey on Security and Privacy Issues of Bitcoin, Dec. 25, 2017, IEEE, web, pp. 1-10 (Year: 2017).*

International Search Authority, "Search report and Written Opinion, Application No. PCT/US2018/059969 filed date Nov. 9, 2018", dated Mar. 14, 2019, 7 pages.

* cited by examiner

*Primary Examiner* — I Jung Liu

(74) *Attorney, Agent, or Firm* — Mannava & Kang, P.C.

(57) ABSTRACT

A server and method for hosting a ledger are provided. The server includes at least one processor; at least one memory including computer program code; the at least one memory and the computer program code configured to, with the at least one processor, cause the ledger at least to: receive, from a buyer bank, authorisation of payment from the buyer bank to a seller bank; transmit a command that triggers a payment sequence to effect payment from the buyer bank to the seller bank, in response to receipt of the authorisation of the payment; and update the ledger on progress of the payment sequence between the buyer bank and the seller bank.

13 Claims, 11 Drawing Sheets

SERVER AND METHOD FOR HOSTING A LEDGER

TECHNICAL FIELD

The present invention relates broadly, but not exclusively, to a server and a method for hosting a ledger.

BACKGROUND

Cross border transactions can be performed using several channels. Some channels are complicated for involving several steps to completely process a single cross-border transaction. An example of a cross border transaction is as follows. A buyer initiates a transaction with a buyer's bank, which in turn communicates with a buyer bank correspondent. The buyer bank correspondent then communicates with a supplier bank correspondent. The buyer bank correspondent or the supplier bank correspondent may be an entity that specializes or is able to deal in cross border transactions. The supplier bank correspondent communicates with a supplier bank which in turn transmits the transaction to the supplier. These steps cause delays in the transaction completion as they are performed manually. There is also little transparency during the payment process and in the event that a transaction is rejected, it is not readily apparent to the parties to the transaction which step in the transaction lead to its rejection.

Further, cross border transactions are often high in volume and involve global corporations using the channels mentioned above. Banks are usually not involved when such channels are used by global corporations. This result in banks having a disadvantage when being excluded from such high volume transactions of global corporations.

A need therefore exists to provide transparency for cross border transactions and to manage invoices of such transactions at the same time. There is also a need to streamline and standardize processes involved in such transactions during which corporations are provided with real time status of the transaction. In addition, a need also exists to provide a platform which facilitates banks and corporations globally to perform and manage cross border transactions.

Herein disclosed are embodiments of methods and servers for hosting a ledger that addresses one or more of the above problems.

Furthermore, other desirable features and characteristics will become apparent from the subsequent detailed description and the appended claims, taken in conjunction with the accompanying drawings and this background of the disclosure.

SUMMARY

According to a first aspect, there is provided a server for hosting a ledger, the server comprising: at least one processor; at least one memory including computer program code; the at least one memory and the computer program code configured to, with the at least one processor, cause the ledger at least to: receive, from a buyer bank, authorisation of payment from the buyer bank to a seller bank; transmit a command that triggers a payment sequence to effect payment from the buyer bank to the seller bank, in response to receipt of the authorisation of the payment; and update the ledger on progress of the payment sequence between the buyer bank and the seller bank.

In an embodiment, the ledger is further configured to, when being updated on the progress of the payment sequence: receive a notification of the payment having been initiated from the buyer bank; indicate that the payment is initiated; receive a notification of a completion of the payment from the buyer bank to the seller bank; and indicate that the payment is completed.

In an embodiment, the payment is in respect of a transaction and wherein the ledger is further configured to maintain a separate entry for each of a plurality of the transactions.

In an embodiment, the ledger is further configured to: maintain a separate account for each of the buyer bank and the seller bank, wherein the buyer bank account is accessible by the buyer bank and the seller bank account is accessible by the seller bank.

In an embodiment, the ledger is further configured to update the buyer bank account and the seller bank account simultaneously when updating the progress of the payment sequence between the buyer bank and the seller bank.

In an embodiment, the ledger is further configured to, before receiving the authorisation of the payment: receive, from the seller bank, a request for an identity of the buyer bank; generate an invoice for the payment; and respond to the seller bank with the identity of the buyer bank and the generated invoice.

In an embodiment, the server is further configured to: map data in the invoice used to identify a buyer to a unique identifier of the buyer; and map data in the invoice used to identify a seller to a unique identifier of the seller, wherein the buyer provides the payment and the seller receives the payment.

In an embodiment, the ledger is further configured to: communicate with a financial network switch during the payment sequence to effect payment from the buyer bank to the seller bank.

According to a second aspect, there is provided a computer-implemented method for hosting a ledger, the method comprising: receiving, from a buyer bank, authorisation of payment from the buyer bank to a seller bank; transmitting a command that triggers a payment sequence to effect payment from the buyer bank to the seller bank, in response to receipt of the authorisation of the payment; and updating the ledger on progress of the payment sequence between the buyer bank and the seller bank.

In an embodiment, the method further comprises: receiving a notification of the payment having been initiated from the buyer bank; indicating that the payment is initiated; receiving a notification of a completion of the payment from the buyer bank to the seller bank; and indicating that the payment is completed.

In an embodiment, the method further comprises: maintaining a separate account for each of the buyer bank and the seller bank, wherein the buyer bank account is accessible by the buyer bank and the seller bank account is accessible by the seller bank.

In an embodiment, the method further comprises, before the step of receiving the authorisation of the payment, receiving, from the seller bank, a request for an identity of the buyer bank; generating an invoice for the payment; and responding to the seller bank with the identity of the buyer bank and the generated invoice.

In an embodiment, data in the invoice used to identify a buyer is configured to be mapped to a unique identifier of the buyer and data in the invoice used to identify a seller is configured to be mapped to a unique identifier of the seller, wherein the buyer provides the payment and the seller receives the payment.

In an embodiment, the method further comprises communicating with a financial network switch during the payment sequence to effect payment from the buyer bank to the seller bank.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1A:
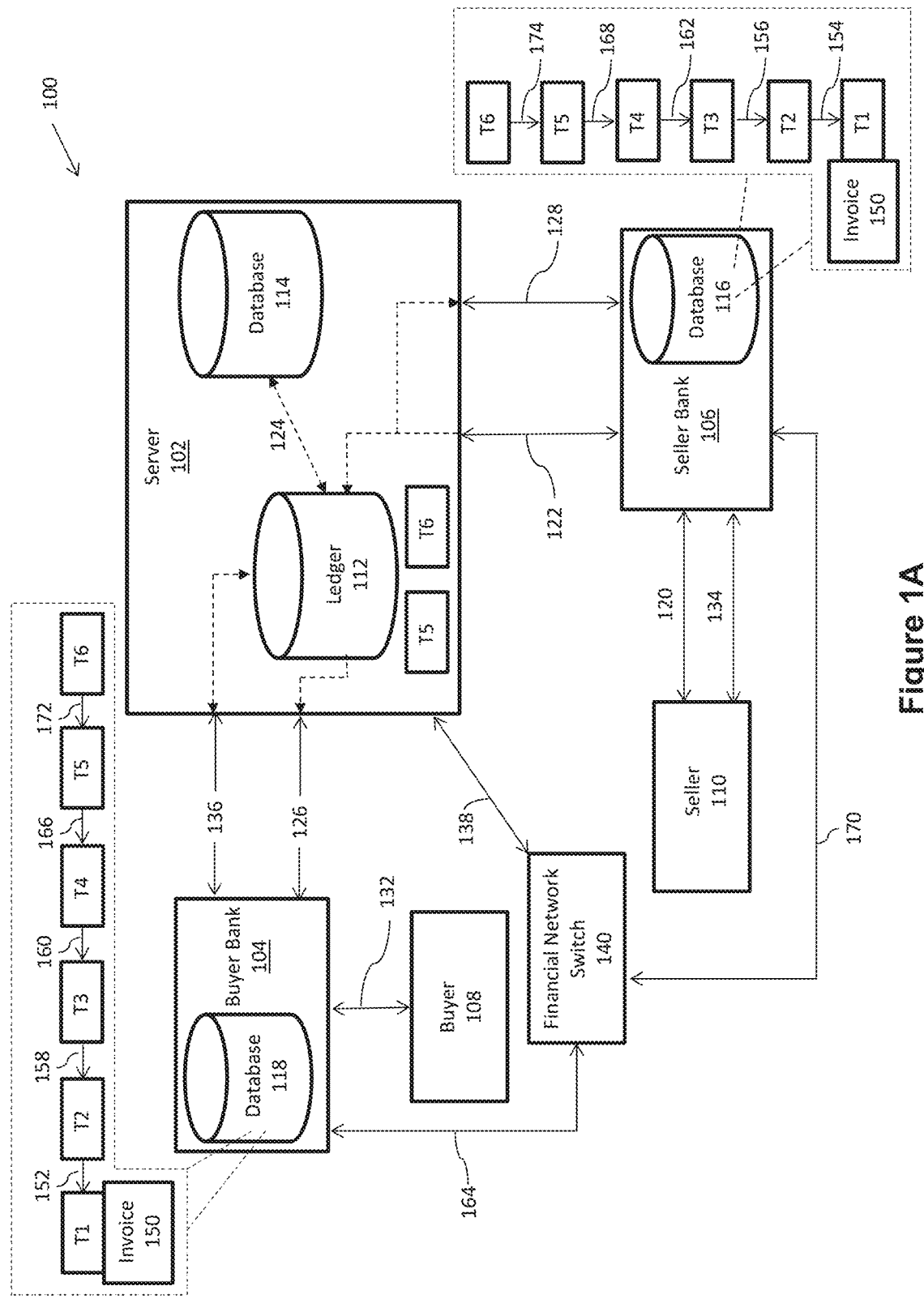
FIG. 1A shows a schematic of a system for hosting a ledger according to an example embodiment.

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "analysing", "determining", "replacing", "generating", "initializing", "outputting", "receiving", "retrieving", "identifying", "predicting" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses server for performing the operations of the methods. Such server may be specially constructed for the required purposes, or may comprise a computer or other device selectively activated or reconfigured by a computer program stored in the computer. The algorithms and displays presented herein are not inherently related to any particular computer or other server. Various machines may be used with programs in accordance with the teachings herein. Alternatively, the construction of more specialized server to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in a server that implements the steps of the preferred method.

In embodiments of the present invention, use of the term 'server' may mean a single computing device or at least a computer network of interconnected computing devices which operate together to perform a particular function. In other words, the server may be contained within a single hardware unit or be distributed among several or many different hardware units.

In the following description, a user (or a merchant) may refer to a party identified to an electronic system using an account number (hereafter referred to as an "account identifier"). In specific embodiments, the account identifier may be linked to various financial institutions. For example, a user may sign up for a universal account so as to be linked to various financial institutions. The user is also a customer who initiates a transaction with a supplier with whom the customer account with the account identifier pays the supplier (or transfer an amount from the customer account). Additionally or alternatively, the user is also a merchant with whom a customer has initiated a transaction to buy good and/or services from the merchant (or transfer an amount to the merchant account). In an embodiment, the transaction is a payment transaction. In other words, effecting the transaction involves a payment between parties to the transaction.

FIG. 1A shows a schematic of a system 100 having a server 102 that hosts a ledger 112 according to an example embodiment. The system 100 includes a buyer bank 104 and a seller bank 106 that are in communication with the server 102. The buyer bank 104 may be in communication with a buyer 108 and the seller bank 106 may be in communication with a seller 110.

It can be appreciated that the buyer bank 104 and the seller bank 106 may be in communication with the buyer 108 and the seller 110 via a respective fixed (wired) computing device or a wireless (portable) computing device, such as a handheld or portable or mobile device or a personal computer, a land-line telephone or an interactive voice response (IVR) system and the like. The mobile device may be a mobile phone, a laptop computer or a personal digital computer (PDA). For the sake of simplicity, communication between the buyer bank 104 and the buyer 108 refers to that between the electronic systems of both the buyer bank 104 and the buyer 108. Similarly, communication between the seller bank 106 and the seller 110 refers to that between the electronic systems of both the seller bank 106 and the seller 110.

The buyer bank 104 generally is associated with the buyer 108 and may be an entity (e.g. a company or organization) which issues (e.g. establishes, manages, administers) a transaction credential or an account (e.g. a financial bank account) to the buyer 108, i.e. a buyer bank account. The buyer bank 104 may have one or more computing devices that are used to establish communication with the server 102 and/or the buyer 108 (via the buyer transaction device) by exchanging messages with and/or passing information to the server 102 and/or buyer 108. In various embodiments below, the buyer bank 104 may be known as a financial institution with which the buyer 108 registers an account to hold funds.

The buyer bank 104 may include a database 118 to store data of the buyer bank account such as balance amount of the buyer 108 and transactions carried out by the buyer 108. Examples of such data include Transaction ID, Payment Amount, Type of Product, Name of Product, Buyer ID, Buyer Country, Buyer Address and Postal Code and or other relevant information that is in respect of a transaction to which the buyer 108 is a party.

The seller bank 106 generally is associated with the seller 110 and who may be an entity (e.g. a company or organization) which issues (e.g. establishes, manages, administers) a transaction credential or an account (e.g. a financial bank account) to the seller 110, i.e. a seller bank account. Examples of the seller bank 106 include a bank and/or other financial institution (or lender). The seller bank 106 may have one or more computing devices that are used to establish communication with the server 102 and/or the seller 110 (via the seller transaction device) by exchanging messages with and/or passing information to the server 102 and/or seller 110. In various embodiments below, the seller bank 106 may be known as a financial institution with which the seller 110 registers an account to hold funds.

The seller bank 106 may include a database 116 to store data of the seller bank account such as balance amount of the seller 110 and transactions carried out by the seller 110. Examples of such data include Transaction ID, Payment Amount, Type of Product, Name of Product, Seller ID, Seller Country, Seller Address and Postal Code and or other relevant information that is in respect of a transaction to which the seller 110 is a party.

For example, buyer ABC has an account with bank X. Bank X stores buyer ABC's data, such as buyer's name and age, in its database. Seller DEF has an account with bank Y. Bank Y stores seller DEF's data, such as place of business and name, in its database.

The ledger 112 maintained by the server 102 may be a principal book or computer file for recording transactions and their respective costs, with debits and credits in separate columns and a beginning monetary balance and ending monetary balance for each account. The ledger 112 is a permanent summary of all amounts entered in supporting journals which list individual transactions by date. Every transaction processed by the ledger 112 populates one or more entries in the ledger 112.

According to various embodiments of the invention, the ledger 112 manages all transactions to which the buyer 108 and the seller 110 are parties. The management functions that the ledger 112 provides includes, but is not limited to, invoice creation, tracking of the invoice status (such as whether the invoice has been created in response to the seller 110 request, acknowledged by the buyer 110 or paid by the buyer bank 104). Accordingly, the ledger provides a common platform through which transactions between the buyer 108 and the seller 110 are initiated and completed. The use of such a platform is advantageous because it provides a common standard in ensuring that data communicated between the ledger 112 and the buyer 108 (through the buyer bank 104) in respect of the transaction; and data communicated between the ledger 112 and the seller 110 (through the seller bank 106) in respect of the transaction complies to rules and protocols set by the ledger 112, which results in ease of tracking of the status of the transaction from both the buyer 108 and the seller 110 ends. In contradistinction, should the buyer 108 and the seller 110 maintain separate ledgers, additional processing effort is required to reconcile differences between communication protocols between such separate ledgers when determining the status of the transaction. The ledger 112 may also maintain a separate account for each of the buyer bank 104 and the seller bank 106, wherein the buyer bank account is accessible by the buyer bank and the seller bank account is accessible by the seller bank. The ledger 112 may also maintain a separate entry for each of a plurality of the transactions.

To enable the ledger 112 to keep track of the status of a transaction between the seller 106 and the buyer 108, the ledger 112 has access to a payment facilitator (not shown) which effects payment between the buyer bank 104 and the seller bank 106. The payment facilitator is either integrated with the server 102 or externally located, whereby there is a dedicated communication channel reserved between the server 102 and the externally located payment facilitator. For example, the server 102 may be part of a network that routes credit card transactions for authorization, such as the Banknet® network operated by MasterCard®. Banknet® links all MasterCard® members and data processing centers into a single financial network, enabling authorization of transactions in seconds. The payment facilitator includes, for example, a switch (compare financial network switch 140) that clears and settles funds for payments between two banks like the one used in the four-party model adopted by the Banknet® network used by MasterCard®.

The server 102 includes a server database 114 configured to communicate with the ledger 112. The server database 114 stores data associated with the ledger 112 and corresponding to a transaction (or transaction data). Examples of the data include Transaction ID, Payment Amount, Type of Product, Name of Product, Buyer ID, Seller ID, Seller Name, Merchant Category Code/Industry Code, Buyer Country, Seller Country, Buyer Address and Postal Code, Seller Address and Postal Code and or other relevant information that is provided when a transaction is requested. For example, data ("Seller Name" or "Seller ID") relating to the seller, time and date for which the products/services relating to the transaction will be delivered are included in the server database 114.

The following discloses one implementation of the ledger 112 involvement in a transaction between the seller 110 and the buyer 108. The buyer 108 makes a request, via the buyer bank 104, to (for example) purchase a good or service provided by the seller 110. The request may include a unique buyer identifier to identify the buyer 108. The unique buyer identifier may be assigned to the buyer 108 during an onboarding process when the buyer 108 registers an account with the ledger 112. During this onboarding, the buyer 108 may provide data including one or more of: its identity, such as name, Merchant Category Code/Industry Code, Industry Description, address, and one or more bank accounts used to fund purchases. It will be appreciated that a similar onboarding procedure is followed to assign a unique seller identifier when onboarding the seller 110. Should the ledger 112 contain other account identifiers, such as those used by the buyer bank 104 to identify the buyer 108 and the seller bank 106 to identify the seller 110, the server 102 is configured to automatically map such account identifiers back to the unique buyer identifier and the unique seller identifier.

In addition to including the buyer unique identity, the request also includes details of the purchased good or service. This request is shared with the seller 110 through a suitable communication sent 136 by the seller bank 106 to the server 102, which in turn routes it to the seller 110 through the seller bank 106.

Upon being notified of the request, the seller 110 sends 120 a command to the seller bank 106 to initiate a transaction with the buyer 108. The command may include the unique buyer identifier identifying the buyer's identity. The seller bank 106 responds to the command by instructing 122 for an entry to be created in the ledger 112 to track the transaction between the buyer 108 and the seller 110. In addition, the seller bank 106 sends 122 a request for an identity of the buyer 108 to the server 102. The server 102 receives the request via the ledger 112 and retrieves 124 the identity of the buyer 108 from the server database 114. Alternatively, the server 102 may query 126 the buyer bank 104 for the identity of the buyer 108. The server 102 then sends 128 the buyer's identity to the seller bank 106.

Thereafter, the server 102 generates an invoice for the transaction. The generated invoice may have metadata in which the buyer's identity is embedded and is transmitted 128. Alternatively, the server 102 responds 128 to the seller bank 106 with the identity of the buyer 108 and the generated invoice, for the seller bank 106 to associate the buyer's identity with the generated invoice. Upon receipt, the seller bank 106 may electronically sign the generated invoice by modifying the generated invoice to incorporate the seller identity so as to reflect that the generated invoice originates from the seller 110 (denoted using the block labelled T1). The signed invoice (denoted using the blocks labelled 150 and T1) is then stored at the database 116 of the seller bank 106. The seller bank 106 sends the signed invoice to the buyer bank 104 via the server 102.

As an illustration, buyer ABC, who has an account in bank X, has indicated an interest to purchase a consignment of vacuum cleaners costing a total of $100K from seller DEF. Seller DEF is notified of the interest and initiates for a transaction to be created via his bank Y. Bank Y sends a request for the identity of ABC through the server 102. The server 102 may retrieve ABC's identity through its database 114 or sends a request to bank X to obtain ABC's identity. After the identity of ABC is obtained, the server 102 then sends ABC's identity to the bank Y. The server 102 generates an invoice for the vacuum cleaner of $100K and bank Y signs on the invoice with seller DEF identity. The signed invoice is then stored at the database of bank Y and bank Y may also send the signed invoice to bank X via the server 102.

The buyer bank 104 stores the signed invoice in its database 118 (denoted using the block 150 with the header T1). The buyer bank 104 then notifies 132 the buyer 108 of the availability of the signed invoice or also sends 132 the signed invoice to the buyer 108. The buyer 108 views the details of the invoice. Upon confirmation that the invoice is acceptable, the buyer 108 acknowledges through a web portal of the buyer bank 104.

Continuing from the above illustration, bank X stores the signed invoice in its database after receipt from bank Y. ABC is then notified by bank X of the invoice and bank X sends the invoice reflecting the cost of $100K for the consignment of the vacuum cleaners to ABC. After ABC confirms that the invoice is acceptable, ABC sends an acknowledgment to the bank X.

The buyer bank 104 updates the stored invoice (i.e. the data block 150 with header T1) by modifying its packet header containing the seller identity to include 152 acknowledgement data T2 indicative of the acknowledgement from the buyer 108. The updated invoice (i.e. the data block 150 with headers T1 and T2) is stored in its database 118. The buyer bank 104 then routes the acknowledgement data T2 to the seller bank 106 through the server 102. Transmission of only the acknowledgement data, as opposed to the entire updated invoice, has the advantage of reducing bandwidth load. The seller bank 106 updates 154 the invoice stored (i.e. the data block 150 with header T1) in its database 116 with the acknowledgement data T2 and notifies 134 the seller 110. The seller 110 prepares the products for shipment or provides the services based on the invoice details and sends a payment request (denoted using the block labelled T3) to the seller bank 106 for routing to the buyer bank 104 through the server 102. The seller bank 106 updates 156 the invoice stored (i.e. the data block 150 with headers T1 and T2) in its database 116 that the payment is being requested from the buyer bank 104 resulting in an updated invoice denoted using the data block 150 with headers T1, T2 and T3. The payment request T3 is sent to the buyer bank 104 via the server 102 which is used to update 158 the invoice stored (i.e. the data block 150 with headers T1 and T2) in the buyer bank 104 database 118.

In the illustration mentioned above, after ABC acknowledges the invoice, bank X signs the invoice with ABC's identity to indicate acceptability and updates the invoice in its database. Bank X then sends the acknowledgement data from ABC to bank Y via the server 102 which bank Y stores it in its database and informs seller DEF. Seller DEF prepares the consignment of vacuum cleaners for shipment and requests payment of $100K for the vacuum cleaner to bank Y. Bank Y updates the payment request of $100K in its database and transmits the request for payment to bank X via the server 102.

The buyer bank 104 notifies 132 the buyer 108 regarding the seller 110 payment request. The buyer 108 signals 132 their approval of the payment request to the buyer bank, which causes the buyer bank 104 to generate an authorisation of payment from the buyer bank 104 to the seller bank 106 (denoted using the block labelled T4). The buyer bank updates 160 its stored invoice packet header (i.e. the data block 150 with headers T1, T2 and T3) with the authorisation of payment T4. The buyer bank 104 routes the authorization of payment T4 to the seller bank 106 through the server 102, which the seller bank 106 uses to update 162 the invoice stored (i.e. the data block 150 with headers T1, T2 and T3) in its database 116. The buyer bank 104 also sends 136 the authorization of payment T4 to the ledger 112 of the server 102.

The ledger 112 transmits a command that triggers a payment sequence to effect payment from the buyer bank 104 to the seller bank 106 in response to receipt of the authorisation of the payment T4. This command is transmitted 138 to a financial network switch 140 of the above-mentioned payment facilitator that effects payment between the buyer bank 104 and the seller bank 106.

The ledger 112 then tracks the payment sequence between the buyer bank 104 and the seller bank 106, as facilitated by the financial network switch 140. For instance, the sequence begins with payment being initiated from the buyer bank 108 to the seller bank 106. This involves the buyer bank 104 sending a signal 164 for the financial network switch 140 to route funds to the seller bank 106. The ledger 112 receives 138 a notification, from the financial network switch 140, of the payment having been initiated from the buyer bank 104 (denoted using the block labelled T5). The receipt of this notification T5 causes the server 102 to sign digitally on the notification and the ledger 112 updates that such payment has been initiated. The ledger 112 also forwards the signed notification T5 to the buyer bank 104 and the seller bank 106 to update 166, 168 the invoices stored (i.e. the data block 150 with headers T1, T2, T3 and T4) in their respective databases 118 and 116.

During the payment sequence, the buyer bank 104 is debited the required amount for payment from the buyer's account, which is updated in the ledger 112 from the ledger being in continuous communication with the financial network switch 140. The receipt of the debited sum from the buyer bank 104 and the credited sum into the seller bank 106 is also captured by the ledger 112. The crediting of the seller 110 account with the seller bank 106 marks the completion of the payment from the buyer bank 104 to the seller bank 106, with the seller bank 106 sending 170 an appropriate notification signal to the financial network switch 140. The ledger 112 receives, from the financial network switch 140, a notification of the completion of the payment from the buyer bank 104 to the seller bank 106 (denoted using the block labelled T6). The ledger 112 is then updated that the payment is completed.

The ledger 112 is thus updated on progress of the payment sequence between the buyer bank 104 and the seller bank 106, upon receiving appropriate communication updates from the financial network switch 140. The ledger 112 forwards the notification of the completion of payment T6 to the buyer bank 104 and the seller bank 106 to update 172, 174 the invoices stored (i.e. the data block 150 with headers T1, T2, T3, T4 and T5) in their respective databases 118 and 116.

Further to the example above, bank X receives the payment request of $100K from bank Y via the server 102 and notifies ABC. ABC approves the payment and bank X generates an authorization of payment of $100K by ABC and updates its stored invoice in its database. Bank X sends the authorization of payment to bank Y through the server 102, where bank Y updates the authorization of payment to the stored invoice in its database. Upon receipt of the authorization of payment from bank X, the server 102 transmits a command to the financial network switch 140 to effect payment of $100K from bank X to bank Y.

The server 102 also tracks payment sequence from bank X to bank Y. For example, the server 102 is notified when bank X generates a payment initiation of $100K to bank Y and the server 102 updates the stored invoice. The server 102 also transmits the notification to bank X and bank Y to update their respective stored invoices. Thereafter, bank X deducts $100K from ABC's account and the $100K is credited into DEF's account by bank Y. The financial network switch 140 then notifies the server 102 that the payment of $100K is completed which in turn updates the ledger 112. The server 102 forwards the notification of payment completion to bank X and bank Y to update their respectively stored invoices.

Figure 1B:
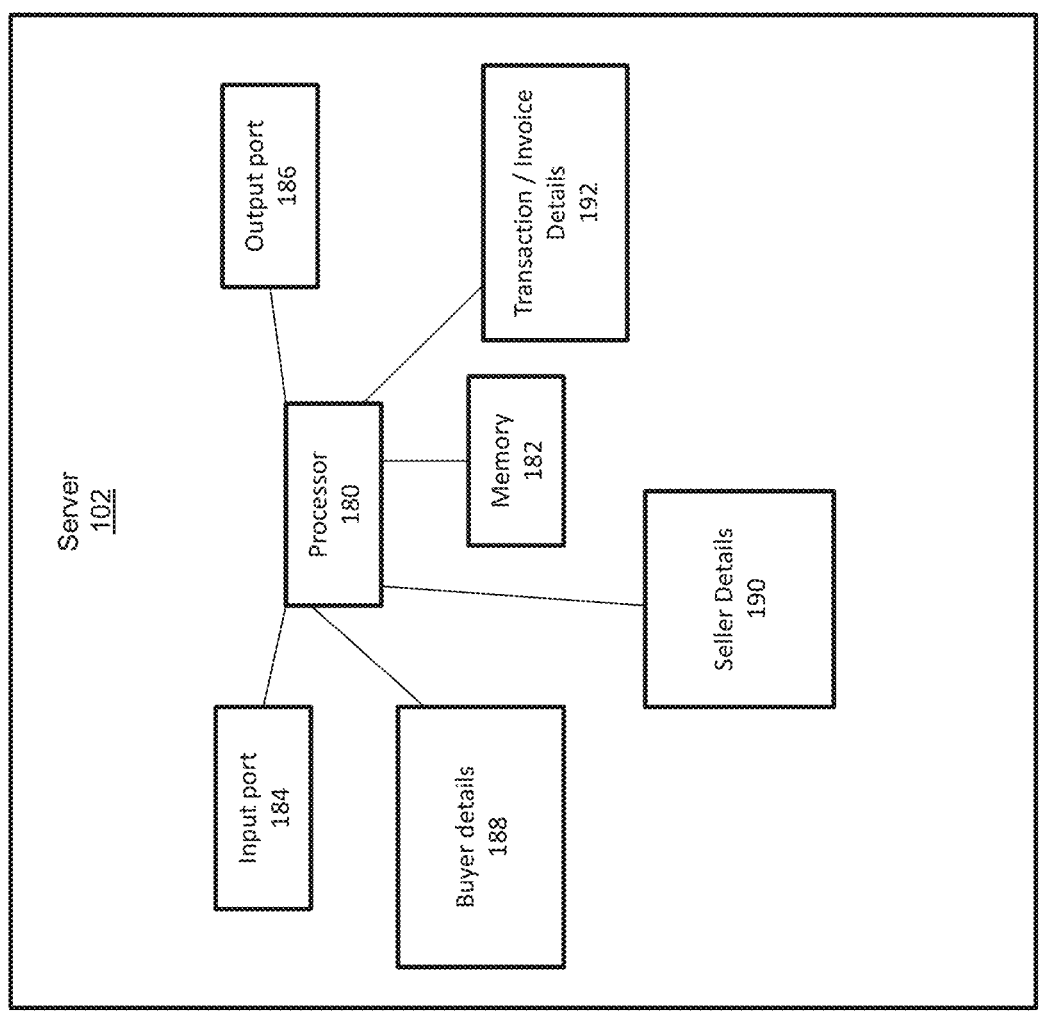
FIG. 1B shows a schematic diagram of functional modules present in the server of FIG. 1A, according to an example embodiment.

FIG. 1B shows a schematic diagram of functional modules present in the server 102 of FIG. 1A, according to an example embodiment. The server 102 may include a processor 180, a memory 182, an input port 184, an output port 186, a buyer details module 188, a seller details module 190 and a transaction/invoice details module 192. Each of the memory 182, the input port 184, the output port 186, the buyer details module 188, the seller details module 190 and the transaction/invoice details module 192 is coupled to the processor 180, so that their respective operations can be controlled by the processor 180. The memory 182 stores computer program code that the processor 180 compiles to have each of the buyer details module 188, the seller details module 190 and the transaction/invoice details module 192 perform their respective functions. Each of the buyer details module 188, the seller details module 190 and the transaction/invoice details module 192 can be implemented using one or more processors present in the server 102. With reference to FIG. 1A, the buyer details module 188 is configured to receive details of buyer 108 while the seller details module 190 is configured to receive details of the seller 110. The transaction/invoice details module 192 is configured to collect data during each sequence of transaction, from initiation of the transaction to the completion of payment to the seller bank 106.

Figure 2A:
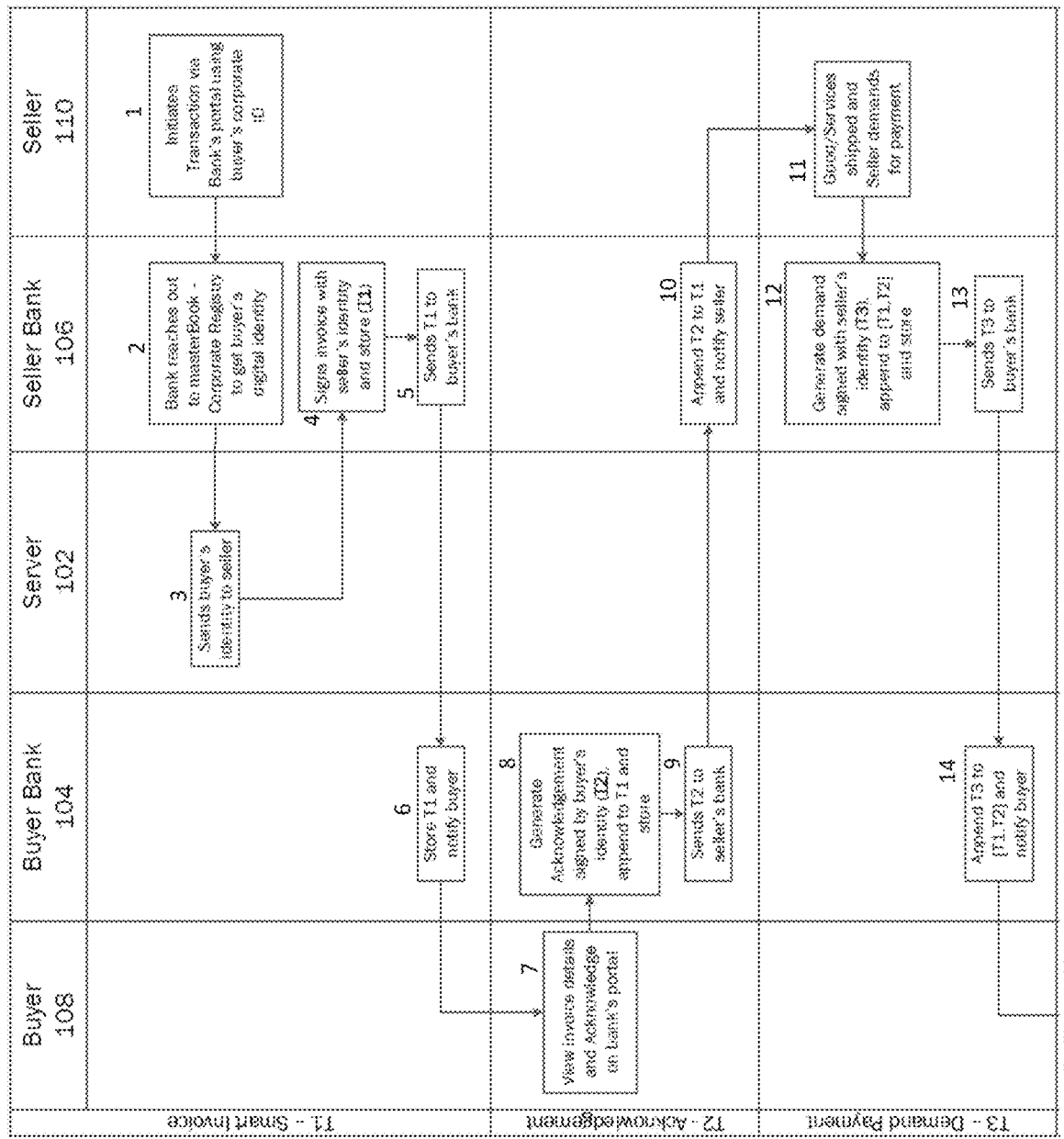
FIGS. 2A to 2C show a schematic diagram illustrating the flow of information in FIG. 1A during a financial transaction.
Figure 2B:
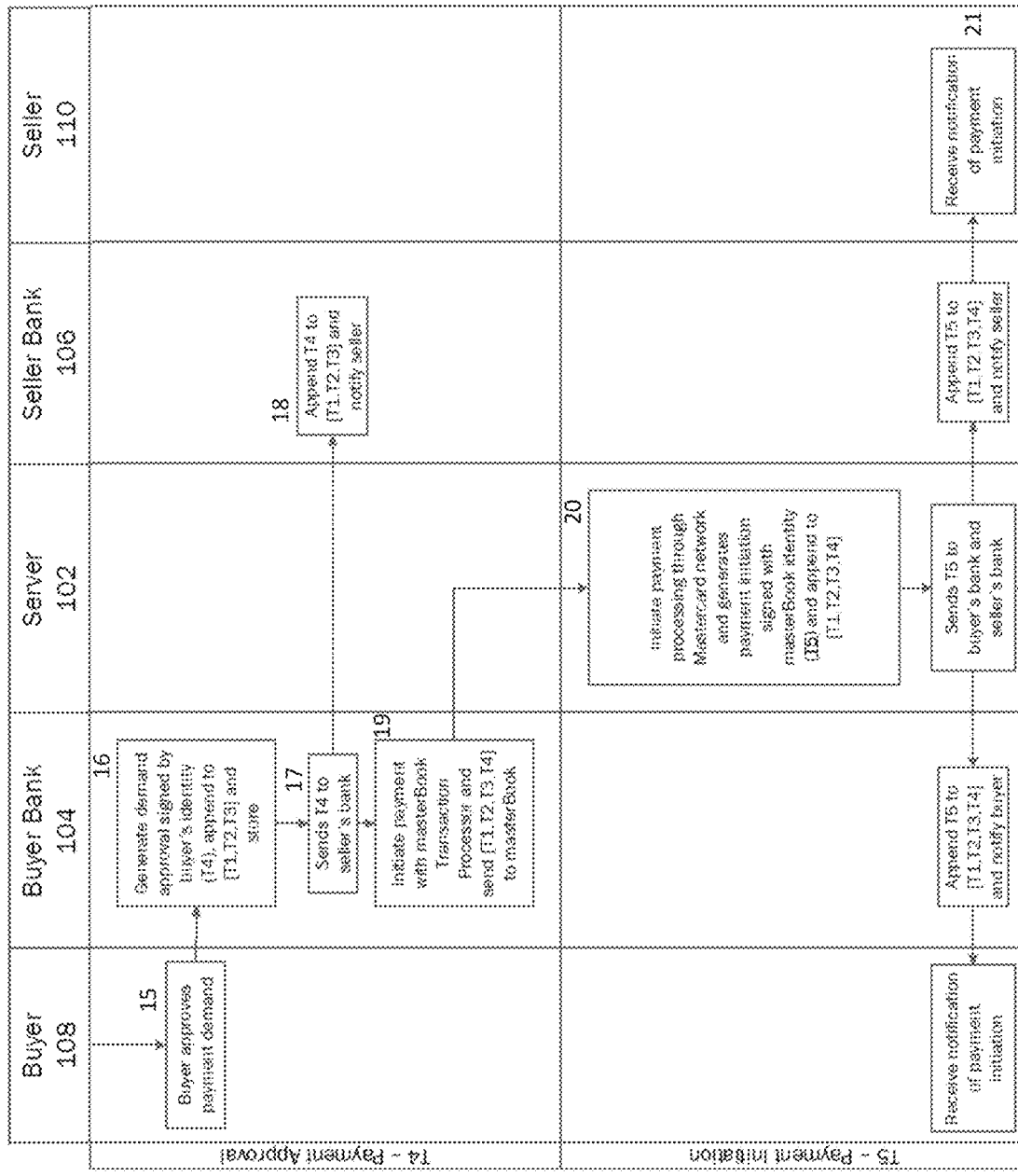
Figure 2C:
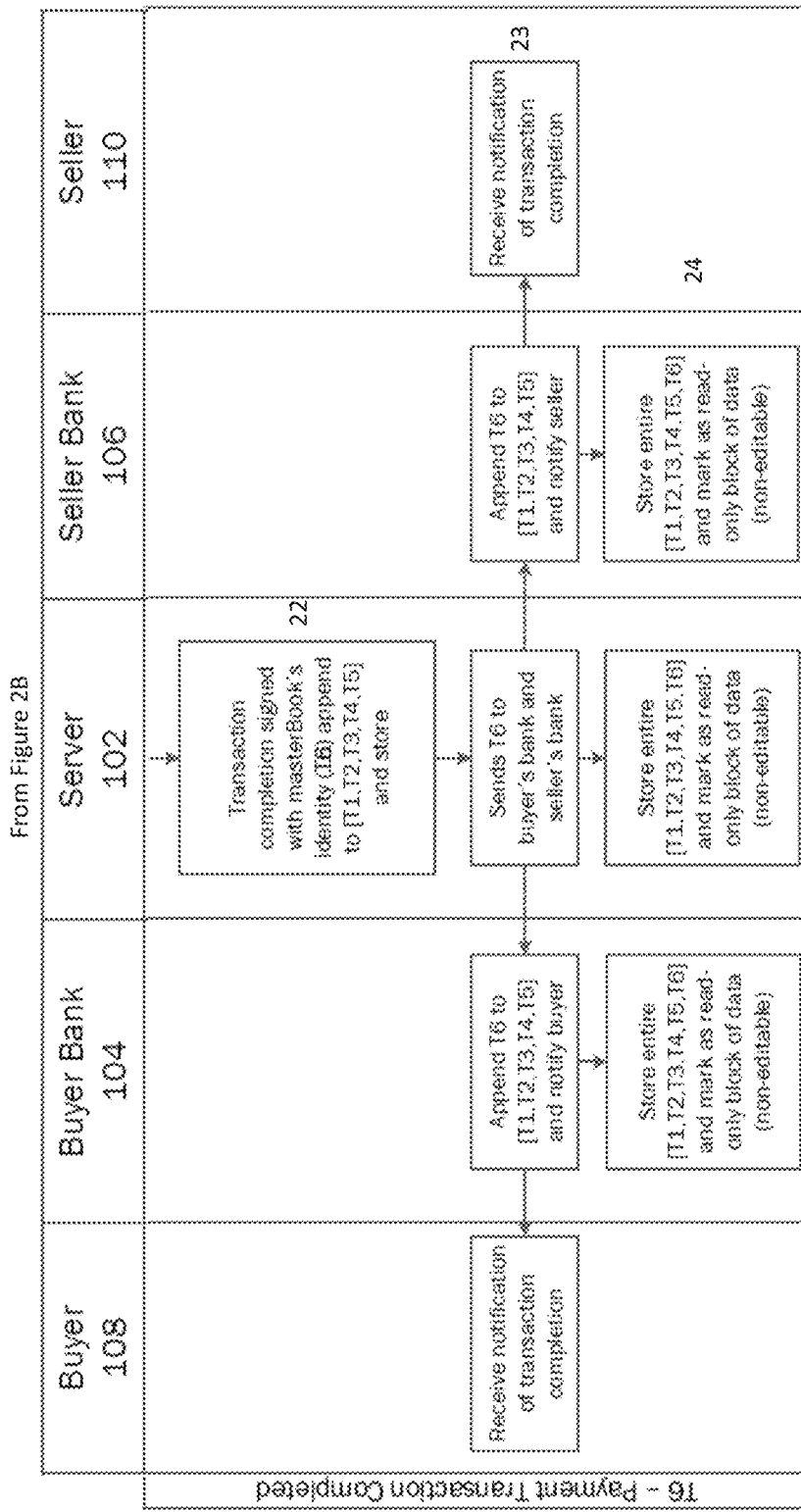

FIGS. 2A to 2C show a schematic diagram illustrating the flow of information occurring at the buyer 108, the buyer bank 104, the server 102, the seller bank 106, the seller 110 and the financial network switch 140 of FIG. 1A during a financial transaction.

At step 1, a transaction is initiated by the seller 110 via the seller bank 106 portal. This transaction is initiated when the buyer 108 registers an interest in wanting to trade with the seller 110, such as sending a request to quote (RTQ). At step 2, the seller bank 106 interrogates the ledger 112 of the server 102 to obtain the buyer 108 identity. At step 3, the server 102 sends the buyer 108 identity to the seller bank 106. At step 4, the seller bank 106 signs an invoice generated by the server 102 with the seller 110 identity and stores it inside its database. At step 5, the seller bank 106 sends the signed invoice T1 to the buyer bank 104 via the server 102.

At step 6, the buyer bank 104 stores the signed invoice T1 and notifies the buyer 108. At step 7, the buyer 108 views the invoice details and acknowledges on the buyer bank 108 portal. At step 8, the buyer bank 104 generates acknowledgement data T2 signed with the buyer 108 identity and updates its database. At step 9, the acknowledgement data T2 is sent to the seller's bank via the server 102. At step 10, the seller bank 106 receives the acknowledgement data T2 and proceeds to update the signed invoice T1 in its database and notifies the seller. At step 11, the seller 110 ships the goods/services and demands for payment. At step 12, the seller bank 106 generates payment demand data T3 signed with the seller 110 identity and updates the invoice stored in its database, so that the signed invoice T1 now contains a header that includes the acknowledgement data T2 and the payment demand data T3. At step 13, the seller bank 106 sends the payment demand data T3 to the buyer bank 104 via the server 102. At step 14, the buyer bank 104 updates its database after receiving the payment demand data T3 and notifies the buyer 108.

FIG. 2B continues from step 14 of FIG. 2A. The buyer 108 approves the requested payment at step 15 resulting from the buyer bank 104 database being updated with the payment demand data T3. At step 16, the buyer bank 104 generates A demand approval (i.e. authorization of payment) T4 signed with the buyer 108 identity and updates its database. At step 17, the buyer's bank sends the demand approval T4 to the seller's bank via the server 102. At step 18, the seller bank 106 updates its database with the demand approval T4 and notifies the seller 110. At step 19, the buyer bank 108 sends the signed invoice T1, acknowledgement data T2, payment demand data T3 and the demand approval T4 to the server 102 so that the ledger 112 processor can initiate payment by sending an appropriate command to a financial network switch. At step 20, the ledger 112 initiates payment processing through the financial network switch and generates payment initiation data T5 signed with the ledger 112 identity and updates the ledger 112. At step 21, the payment initiation data T5 is sent to the buyer bank 104 and the seller bank 106, which in turn updates their respective databases and notifies the buyer 108 and the seller 110 of the payment initiation.

FIG. 2C continues from step 21 of FIG. 2B. At step 22, after the financial network switch confirms that payment has been completed, the ledger 112 is notified, generating payment completion data T6 signed with the ledger 112 identity which is updated in the ledger 112 database. At step 23, the payment completion data T6 is sent to the buyer bank 104 and the seller bank 106 which in turn updates their respective databases and notifies the buyer 108 and the seller 110 of the transaction completion. At step 24, the buyer bank 104, the seller bank 106 and the ledger 112 store the signed invoice T1, acknowledgement data T2, payment demand data T3, the demand approval T4, payment initiation data T5 and the payment completion data T6 in their respective databases as read-only block of data which is non-editable.

Figure 3:
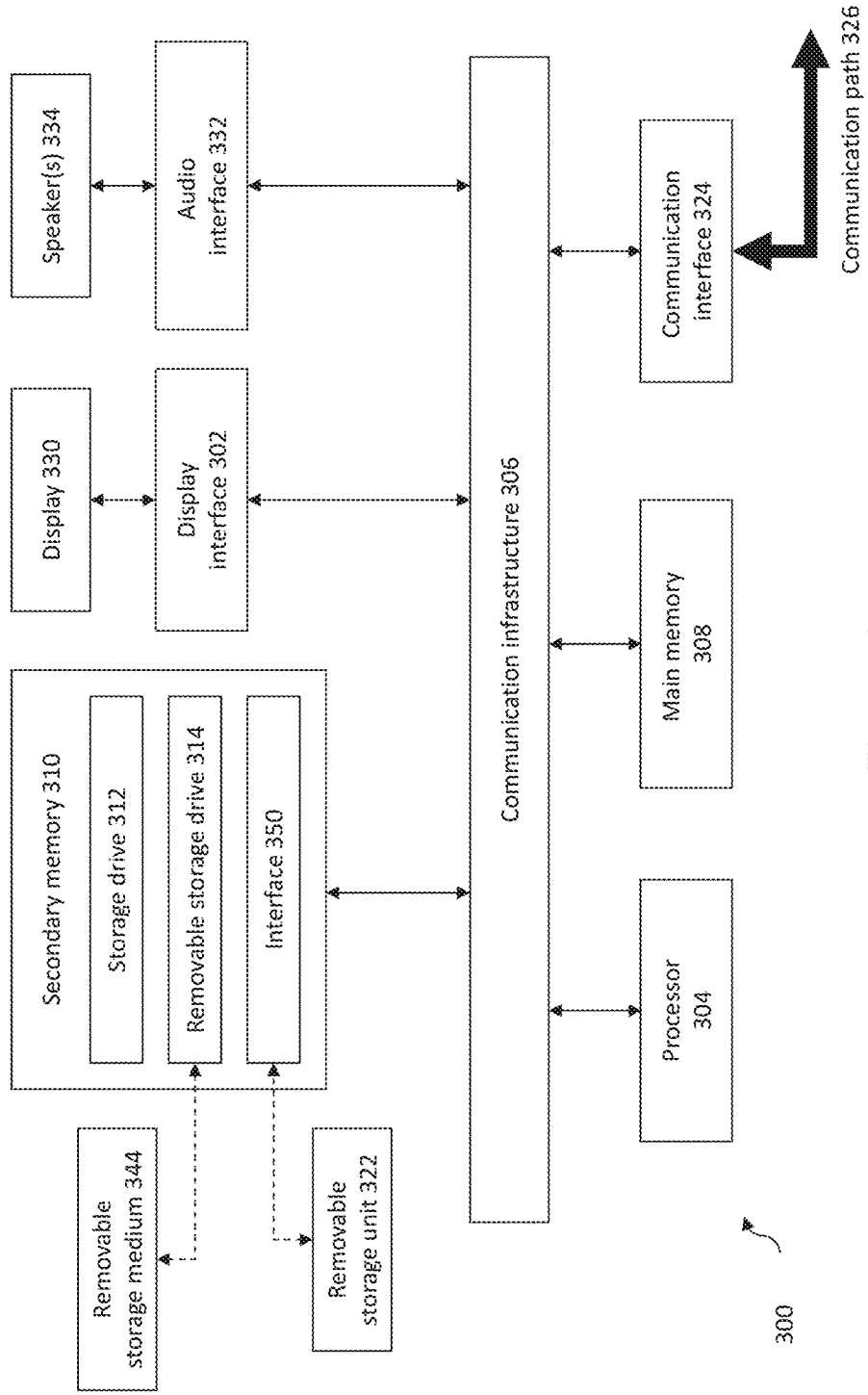
FIG. 3 shows a schematic of a computing device used to realise the server for hosting a ledger shown in FIG. 1A.

FIG. 3 shows a schematic of a computing device used to realise the server 102 shown in FIG. 1A. The following description of the computing device 300 is provided by way of example only and is not intended to be limiting.

As shown in FIG. 3, the example computing device 300 includes a processor 304 for executing software routines. Although a single processor is shown for the sake of clarity, the computing device 300 may also include a multi-processor system. The processor 304 is connected to a communication infrastructure 306 for communication with other components of the computing device 300. The communication infrastructure 306 may include, for example, a communications bus, cross-bar, or network.

The computing device 300 further includes a main memory 308, such as a random access memory (RAM), and a secondary memory 310. The secondary memory 310 may include, for example, a storage drive 312, which may be a hard disk drive, a solid state drive or a hybrid drive and/or a removable storage drive 314, which may include a magnetic tape drive, an optical disk drive, a solid state storage drive (such as a USB flash drive, a flash memory device, a solid state drive or a memory card), or the like. The removable storage drive 314 reads from and/or writes to a removable storage medium 344 in a well-known manner.

The removable storage medium 344 may include magnetic tape, optical disk, non-volatile memory storage medium, or the like, which is read by and written to by removable storage drive 314. As will be appreciated by persons skilled in the relevant art(s), the removable storage medium 344 includes a computer readable storage medium having stored therein computer executable program code instructions and/or data.

In an alternative implementation, the secondary memory 310 may additionally or alternatively include other similar means for allowing computer programs or other instructions to be loaded into the computing device 300. Such means can include, for example, a removable storage unit 322 and an interface 350. Examples of a removable storage unit 322 and interface 350 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 322 and interfaces 350 which allow software and data to be transferred from the removable storage unit 322 to the computer system 300.

The computing device 300 also includes at least one communication interface 324. The communication interface 324 allows software and data to be transferred between computing device 200 and external devices via a communication path 326. In various embodiments of the inventions, the communication interface 324 permits data to be transferred between the computing device 300 and a data communication network, such as a public data or private data communication network. The communication interface 324 may be used to exchange data between different computing devices 300 which such computing devices 300 form part an interconnected computer network. Examples of a communication interface 324 can include a modem, a network interface (such as an Ethernet card), a communication port (such as a serial, parallel, printer, GPIB, IEEE 1394, RJ45, USB), an antenna with associated circuitry and the like. The communication interface 324 may be wired or may be wireless. Software and data transferred via the communication interface 324 are in the form of signals which can be electronic, electromagnetic, optical or other signals capable of being received by communication interface 324. These signals are provided to the communication interface via the communication path 326.

As shown in FIG. 3, the computing device 300 further includes a display interface 302 which performs operations for rendering images to an associated display 330 and an audio interface 332 for performing operations for playing audio content via associated speaker(s) 334.

As used herein, the term "computer program product" may refer, in part, to removable storage medium 344, removable storage unit 322, a hard disk installed in storage drive 312, or a carrier wave carrying software over communication path 326 (wireless link or cable) to communication interface 324. Computer readable storage media refers to any non-transitory, non-volatile tangible storage medium that provides recorded instructions and/or data to the computing device 200 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 300. Examples of transitory or non-tangible computer readable transmission media that may also participate in the provision of software, application programs, instructions and/or data to the computing device 300 include radio or infra-red transmission channels as well as a network connection to another computer or networked device, and the Internet or Intranets including e-mail transmissions and information recorded on Websites and the like.

The computer programs (also called computer program code) are stored in main memory 308 and/or secondary memory 310. Computer programs can also be received via the communication interface 324. Such computer programs, when executed, enable the computing device 300 to perform one or more features of embodiments discussed herein. In various embodiments, the computer programs, when executed, enable the processor 304 to perform features of the above-described embodiments. Accordingly, such computer programs represent controllers of the computer system 300.

Software may be stored in a computer program product and loaded into the computing device 300 using the removable storage drive 314, the storage drive 312, or the interface 350. The computer program product may be a non-transitory computer readable medium. Alternatively, the computer program product may be downloaded to the computer system 300 over the communications path 326. The software, when executed by the processor 304, causes the computing device 300 to perform functions of embodiments described herein.

It is to be understood that the embodiment of FIG. 3 is presented merely by way of example. Therefore, in some embodiments one or more features of the computing device 300 may be omitted. Also, in some embodiments, one or more features of the computing device 300 may be combined together. Additionally, in some embodiments, one or more features of the computing device 300 may be split into one or more component parts. The main memory 308 and/or the secondary memory 310 may serve(s) as the memory for the server 102; while the processor 304 may serve as the processor of the server 102.

Figure 4:
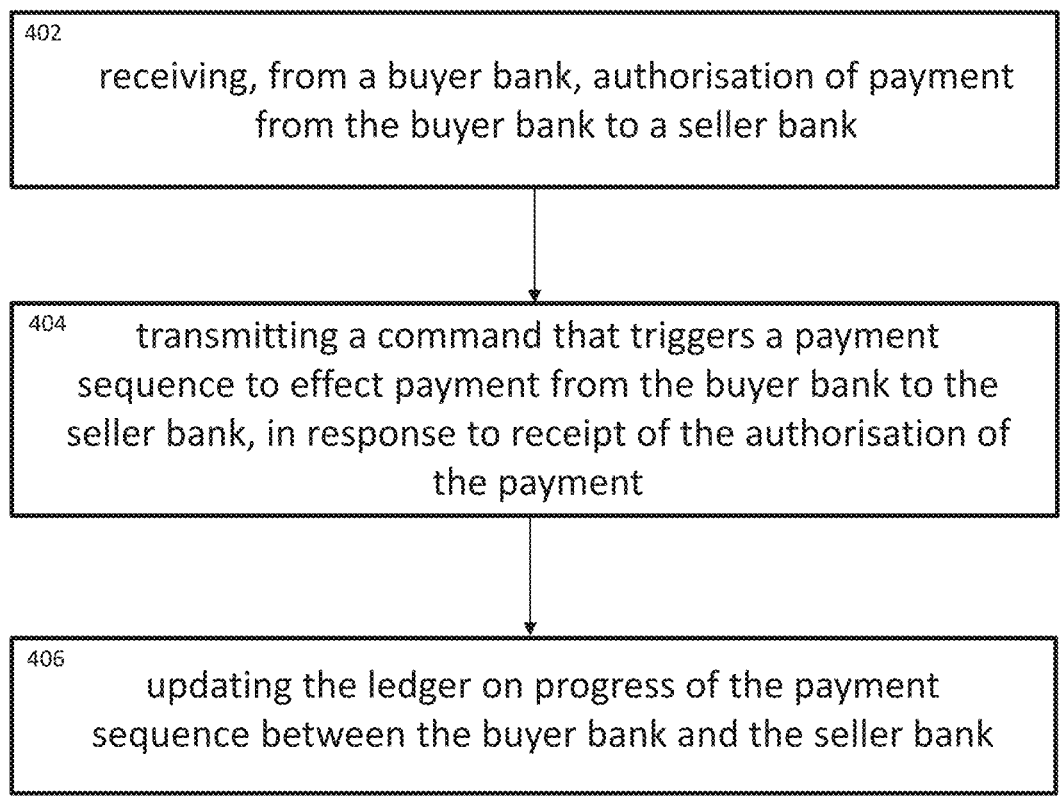
FIG. 4 shows a flowchart depicting steps for hosting a ledger, according to an example embodiment.

FIG. 4 shows a flowchart 400 depicting steps for hosting a ledger, according to an example embodiment. At step 402, authorisation of payment from a buyer bank to a seller bank is received from the buyer bank. At step 404, a command that triggers a payment sequence to effect payment from the buyer bank to the seller bank is transmitted in response to receipt of the authorisation of the payment. At step 406, the ledger is updated on progress of the payment sequence between the buyer bank and the seller bank.

It will be appreciated by a person skilled in the art that numerous variations and/or modifications may be made to the present invention as shown in the specific embodiments without departing from the spirit or scope of the invention as broadly described. For example, the above description mainly discusses the use of a Bluetooth connection, but it will be appreciated that another type of secure wireless connection, such as Wi-Fi, can be used in alternate embodiments to implement the method. Some modifications, e.g. adding an access point, changing the log-in routine, etc. may be considered and incorporated. The present embodiments are, therefore, to be considered in all respects to be illustrative and not restrictive.

Figure 5A:
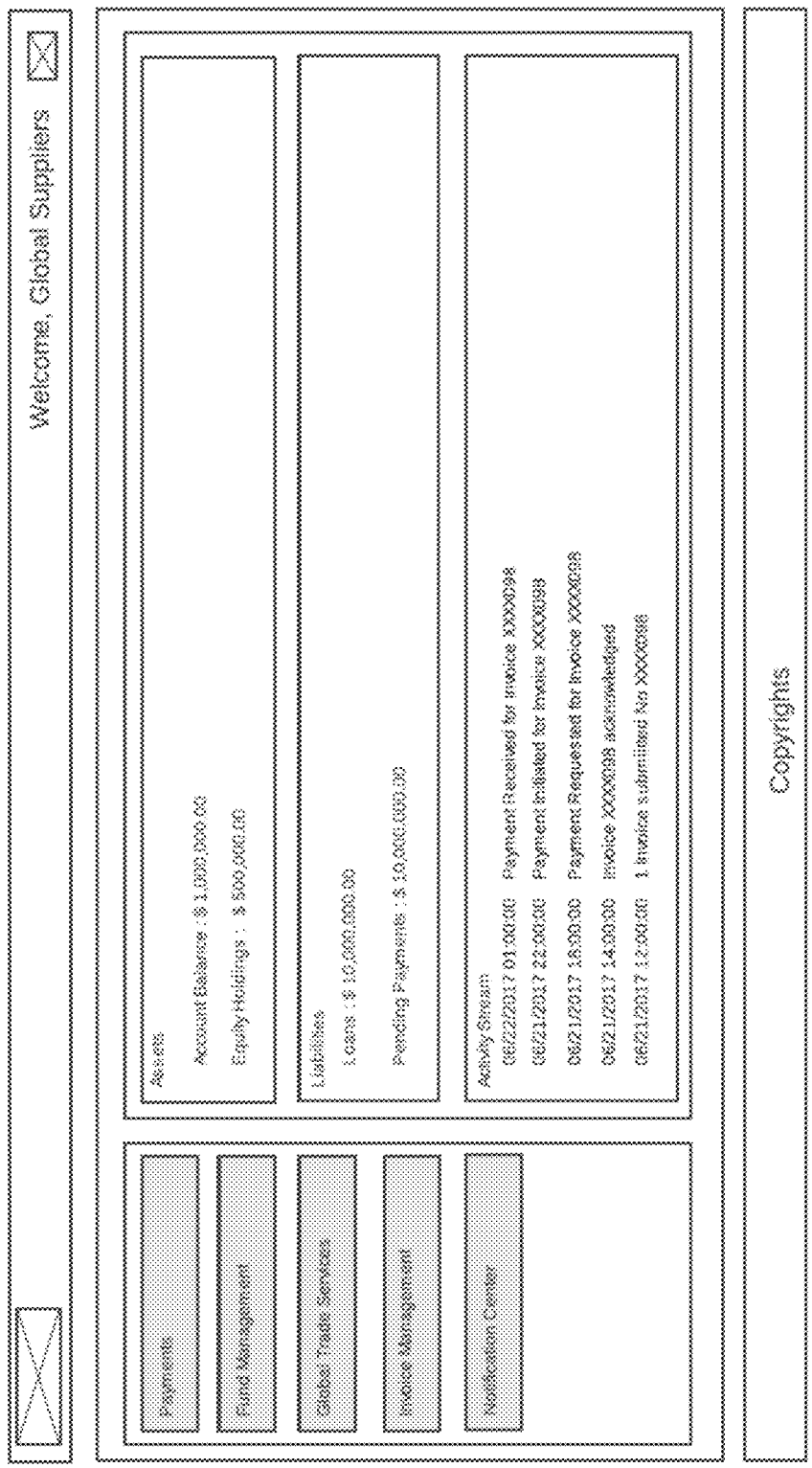
FIG. 5A shows an application interface of a ledger indicating the assets, liabilities and status of various transactions of a buyer or a seller, according to an example embodiment.

FIG. 5A shows an application interface of a ledger indicating the assets, liabilities and status of various transactions of a buyer or a seller, according to an example embodiment. In this Figure, the ledger of a business entity Global Suppliers is shown in the application interface. The ledger shows the assets, liabilities and activity stream of Global Suppliers so that the business entity can view the latest transactions and their status in real-time. As shown in the Figure, Global Suppliers is able to view the status of invoice XXXX098 indicating the time and date for each process in the activity stream.

Figure 5B:
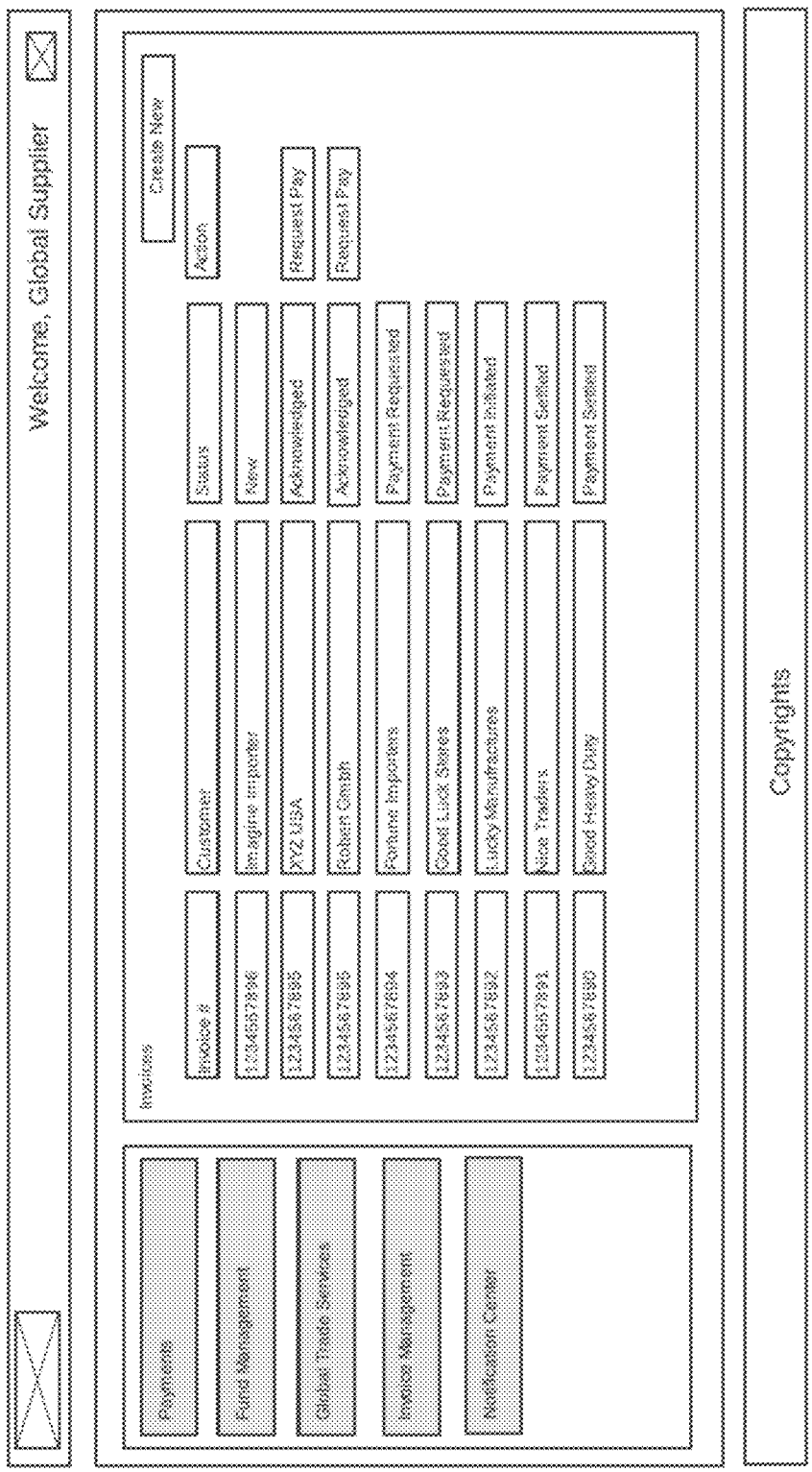
FIG. 5B shows a schematic diagram of an invoice generated by the server of FIG. 1A, according to an example embodiment.
Figure 5C:
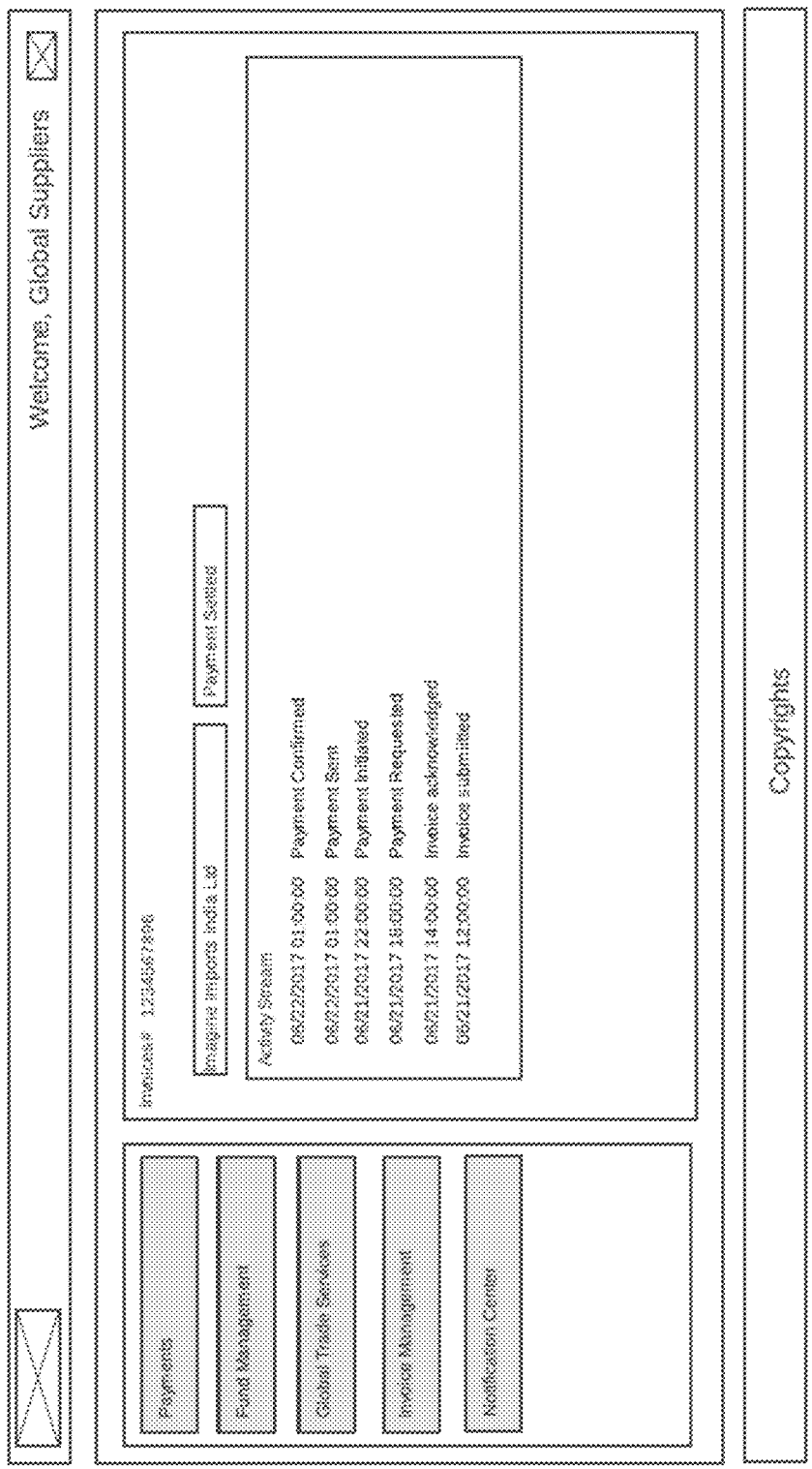
FIG. 5C shows a schematic diagram of the details of the generated invoice of FIG. 5B, according to an example embodiment.
Figure 6:
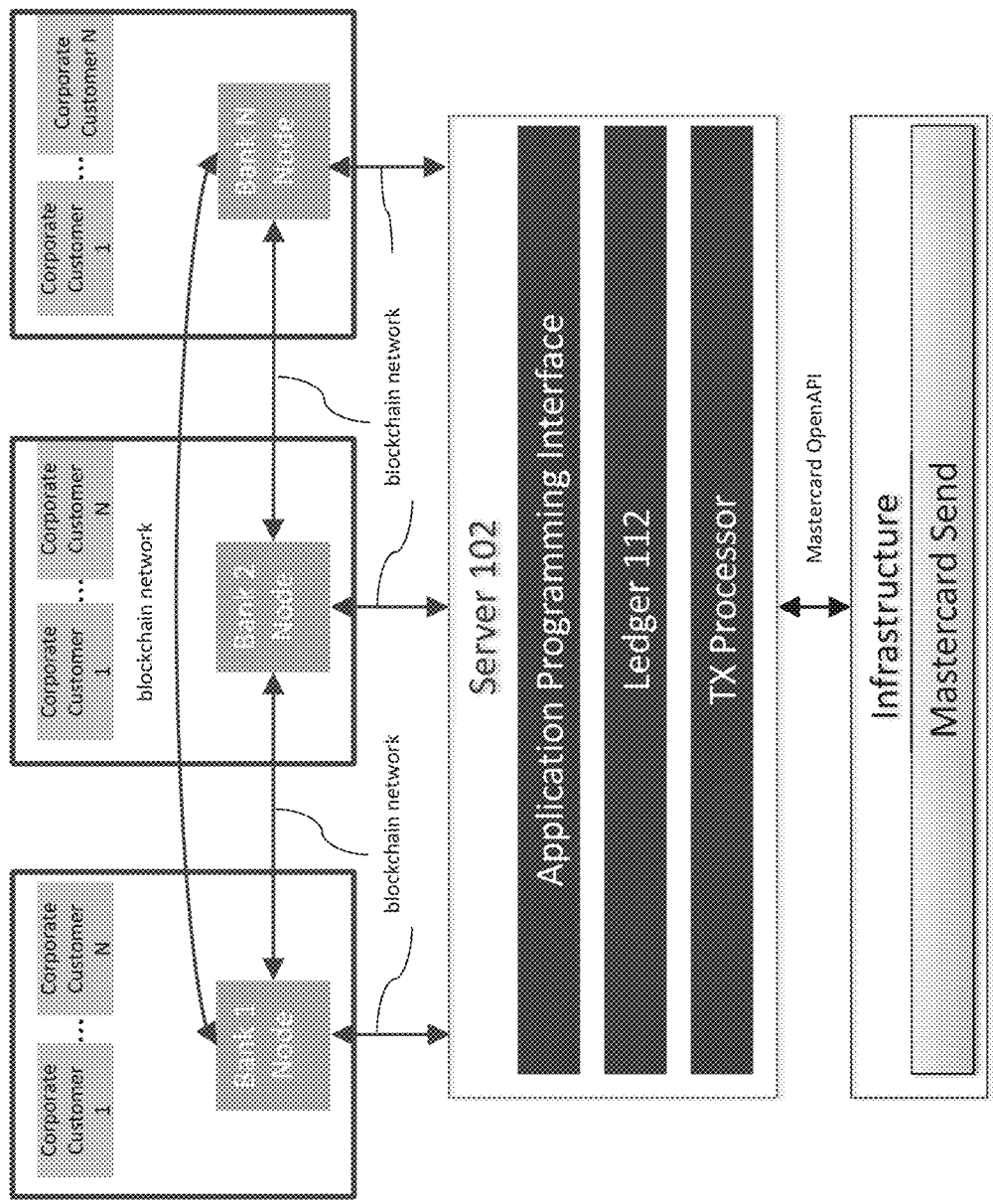
FIG. 6 shows a schematic diagram illustrating the relationship between the seller bank 106, the server 102 and the financial network switch 140 of FIG. 1A, according to an example embodiment.

FIG. 5B shows a schematic diagram of an invoice generated by the server 102 of FIG. 1A while FIG. 5C shows a schematic diagram of the details of the generated invoice of FIG. 5B, according to an example embodiment. Global Suppliers may click on the "Invoice Management" tab in order to view the different invoices as shown in FIG. 5B. Each of the invoices is linked to another entity and its status can be seen in this interface. In FIG. 5C, the details of the status of each invoice such as "payment confirmation", "invoice acknowledgement" etc. are shown with the date and time. Even after payment has been completed, Global Suppliers may still view the status of each transaction of the invoice stored in the ledger.

6 shows a schematic diagram illustrating the relationship between the seller bank 106, the server 102 and the financial network switch 140 of FIG. 1A, according to an example embodiment. In the Figure, different banks, for example buyer bank 104 and/or seller bank 106 of FIG. 1A, are in communication with each other and the ledger 112 of the server 102 of FIG. 1A, via for example, a blockchain network. The ledger 112 is in communication with payment infrastructure such as the financial network switch 140 of FIG. 1A via an application programming interface. Each of the banks is associated with a corporate customer (i.e. a buyer 108 or a seller 110 of FIG. 1A) and may manage their bank accounts for storing funds. The server 102 may include an application programming interface (shown in FIGS. 5A to 5C), a corporate registry (i.e. the ledger 112 of FIG. 1A) and a transaction processor. Each of the corporate customers of the banks may be assigned a unique corporate payment identity and stored in the ledger 112 registry. The unique corporate payment identity may be used to update the ledger 112 during each stage of the transaction as illustrated in FIGS. 2A to 2C.

What is claimed is:

1. A system comprising:
    a server that executes a ledger in a blockchain network, the server comprising at least one processor programmed to:
        receive, from a buyer bank, an authorization to make a payment from the buyer bank to a seller bank, the authorization comprising a data block having a first header representing an invoice digitally signed by the seller bank based on a digital seller identity to indicate a source of the invoice and a second header digitally signed by the buyer bank based on a buyer digital identity to indicate acknowledgement of the invoice;
        transmit a command that triggers a payment sequence to effect payment from the buyer bank to the seller bank, in response to receipt of the authorization of the payment;
        receive, from the seller bank, a request for an identity of the buyer bank;
        generate the invoice for the payment, wherein data in the invoice used to identify a buyer is configured to be mapped to a unique identifier of the buyer and data in the invoice used to identify a seller is configured to be mapped to a unique identifier of the seller, wherein the buyer provides the payment and the seller receives the payment; and respond to the seller bank with the identity of the buyer bank and the generated invoice;

generate a header that indicates a progress of the payment sequence;

digitally sign the header based on a ledger identifier;

append the digitally signed header to the data block;

update the ledger based on the data block appended with the digitally signed header that indicates the progress of the payment sequence; and communicate with a financial network switch during the payment sequence to effect payment from the buyer bank to the seller bank.

2. The system of claim 1, wherein the processor is further programmed to, when being updated on the progress of the payment sequence:

receive a notification of the payment having been initiated from the buyer bank;

indicate that the payment is initiated;

receive a notification of a completion of the payment from the buyer bank to the seller bank; and indicate that the payment is completed.

3. The system of claim 1, wherein the payment is in respect of a transaction and wherein the processor is further programmed to maintain a separate entry for each of a plurality of the transactions.

4. The system of claim 1, wherein the processor is further programmed to:

maintain a separate account for each of the buyer bank and the seller bank, wherein the buyer bank account is accessible by the buyer bank and the seller bank account is accessible by the seller bank.

5. The system of claim 4, wherein the processor is further programmed to update the buyer bank account and the seller bank account simultaneously when updating the progress of the payment sequence between the buyer bank and the seller bank.

6. The system of claim 1, wherein the processor is further programmed to, before receiving the authorization of the payment:

receive, from the seller bank, a request for an identity of the buyer bank;

generate the invoice for the payment; and respond to the seller bank with the identity of the buyer bank and the generated invoice.

7. The system of claim 6, wherein the processor is further programmed to:

map data in the invoice used to identify a buyer to a unique identifier of the buyer; and map data in the invoice used to identify a seller to a unique identifier of the seller, wherein the buyer provides the payment and the seller receives the payment.

8. The system of claim 1, wherein the processor is further programmed to:

communicate with a financial network switch during the payment sequence to effect payment from the buyer bank to the seller bank.

9. A computer-implemented method for hosting a ledger, the method comprising:

receiving, by a processor of a server, from a buyer bank, an authorization to make a payment from the buyer bank to a seller bank, the authorization comprising a data block having a first header representing an invoice digitally signed by the seller bank based on a digital seller identity to indicate a source of the invoice and a second header digitally signed by the buyer bank based on a buyer digital identity to indicate acknowledgement of the invoice;

receiving, from the seller bank, a request for an identity of the buyer bank;

generating the invoice for the payment, wherein data in the invoice used to identify a buyer is configured to be mapped to a unique identifier of the buyer and data in the invoice used to identify a seller is configured to be mapped to a unique identifier of the seller, wherein the buyer provides the payment and the seller receives the payment; and responding to the seller bank with the identity of the buyer bank and the generated invoice;

transmitting, by the processor, a command that triggers a payment sequence to effect payment from the buyer bank to the seller bank, in response to receipt of the authorization of the payment;

generating, by the processor, a header that indicates a progress of the payment sequence;

digitally signing, by the processor, the header based on a ledger identifier;

appending, by the processor, the digitally signed header to the data block; and updating, by the processor, the ledger based on the data block appended with the digitally signed header that indicates the progress of the payment sequence; and communicating with a financial network switch during the payment sequence to effect payment from the buyer bank to the seller bank.

10. The method of claim 9, the method further comprising:

receiving a notification of the payment having been initiated from the buyer bank;

indicating that the payment is initiated;

receiving a notification of a completion of the payment from the buyer bank to the seller bank; and indicating that the payment is completed.

11. The method of claim 9, wherein the payment is in respect of a transaction and wherein the ledger is further configured to maintain a separate entry for each of a plurality of the transactions.

12. The method of claim 9, the method further comprising:

maintaining a separate account for each of the buyer bank and the seller bank, wherein the buyer bank account is accessible by the buyer bank and the seller bank account is accessible by the seller bank.

13. The method of claim 12, wherein the ledger is further configured to update the buyer bank account and the seller bank account simultaneously when updating the progress of the payment sequence between the buyer bank and the seller bank.

* * * * *